United States Patent [19]
Rhoades et al.

[11] Patent Number: 5,257,503
[45] Date of Patent: Nov. 2, 1993

[54] METHOD AND APPARATUS FOR AUTOMATIC PRODUCTION OF BLOCKS OF SOLID CARBON DIOXIDE AT LOW PRESSURE

[75] Inventors: George D. Rhoades, LaGrange; Roger F. Gyger, Naperville, both of Ill.; José M. A. Anaya Izquierdo; Emilio A. Fernández, both of Mexico City, Mexico

[73] Assignee: Liquid Carbonic Corporation, Del.

[21] Appl. No.: 807,050

[22] Filed: Dec. 12, 1991

[51] Int. Cl.$^5$ .................................................. F25J 1/00
[52] U.S. Cl. ............................................. 62/10; 62/35; 62/384; 62/388
[58] Field of Search .................... 62/10, 35, 384, 388

[56] References Cited

U.S. PATENT DOCUMENTS

| | | | |
|---|---|---|---|
| 1,795,772 | 3/1931 | Goosmann | 62/10 |
| 1,870,691 | 8/1932 | Rust et al. | 62/10 |
| 1,925,041 | 8/1933 | Auerbach | 62/121 |
| 1,925,619 | 9/1933 | Zumbro | 62/121 |
| 1,950,180 | 3/1934 | Jones et al. | 62/121 |
| 2,738,658 | 3/1956 | Bronson | 62/122 |
| 3,124,442 | 3/1964 | Rich | 62/35 |
| 3,443,389 | 5/1969 | Townsend et al. | 62/10 |
| 3,661,483 | 5/1972 | Bose | 62/384 |
| 3,817,045 | 6/1974 | Muska | 62/10 |
| 4,033,736 | 7/1977 | Cann | 62/10 |
| 4,770,684 | 9/1988 | Tsukada et al. | 62/35 |

*Primary Examiner*—Ronald C. Capossela
*Attorney, Agent, or Firm*—Fitch, Even, Tabin & Flannery

[57] ABSTRACT

A method and apparatus to automatically produce blocks of solid $CO_2$ at low pressure. The apparatus includes at least one closed mold coupled to a liquid $CO_2$ conditioner and a $CO_2$ gas recovery system, and a control panel for automatic operation. The method consists in supplying liquid $CO_2$ to this mold at a low pressure in order to fill the mold with $CO_2$ snow of low density during a definite period of time, to then raise the pressure inside the mold to an intermediate pressure by supplying liquid $CO_2$ at this pressure (and at a temperature of approximately $-40°$ C.) to form a dense mass of solid $CO_2$ which after a definite time will block the admission of $CO_2$ to the mold, causing a significant pressure drop that is used to create a signal to automatically close off the supply of liquid $CO_2$ and finalize the production cycle of the block.

20 Claims, 2 Drawing Sheets

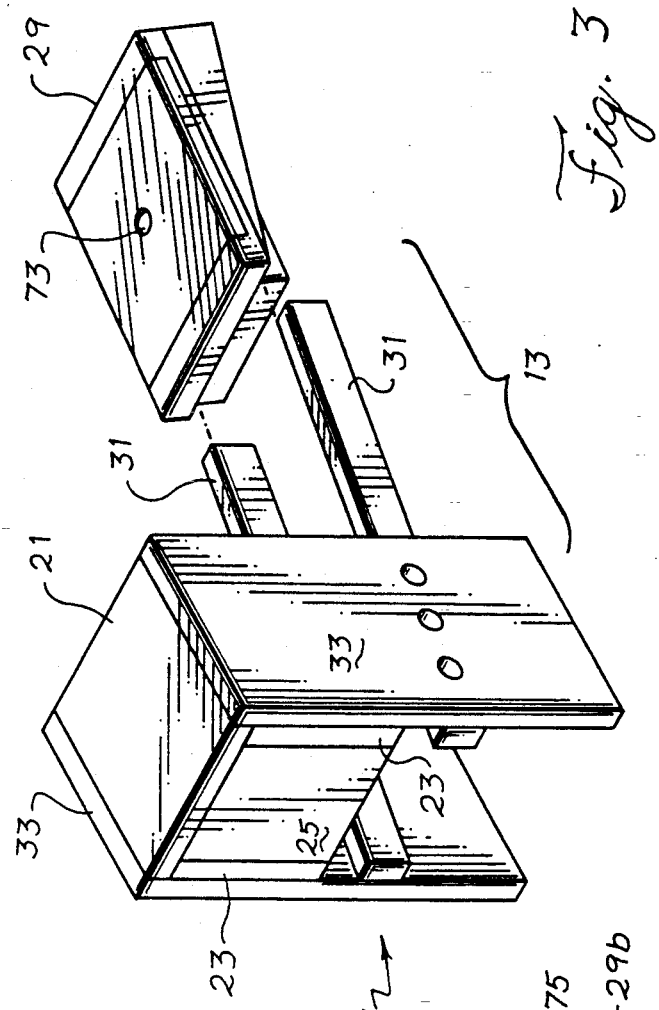
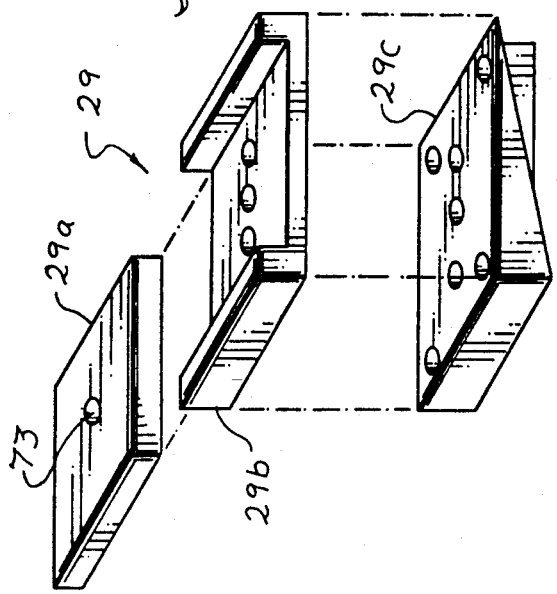
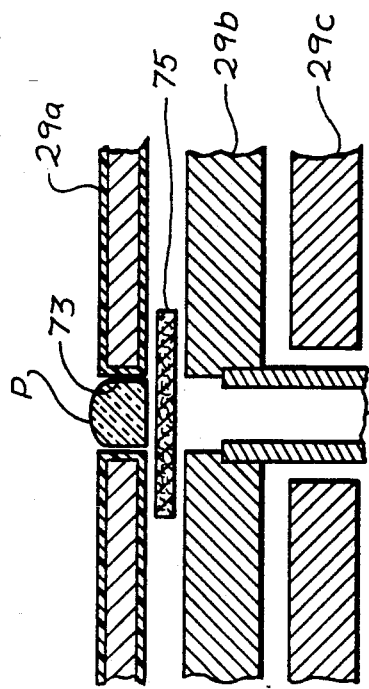

METHOD AND APPARATUS FOR AUTOMATIC PRODUCTION OF BLOCKS OF SOLID CARBON DIOXIDE AT LOW PRESSURE

FIELD OF THE INVENTION

This invention is related in general to a method and apparatus for solidification of carbon dioxide ($CO_2$) and in particular to a method and apparatus for automatic production at a low pressure of blocks of solid carbon dioxide with a density of 1.1 to 1.50 $g/cm^3$ or greater.

BACKGROUND OF THE INVENTION

The process of solidification of liquid $CO_2$ to form solid $CO_2$, commonly called "dry ice", is a widely known process, with the product being used commercially to transport and store medicines or already frozen or fresh foods, to cause artificial rain, to extinguish fire, to contract metal, etc.

Typically, the conventional processes for producing solid $CO_2$ involve first creating a mass of $CO_2$ snow at a pressure near atmospheric pressure, and then compressing this mass, giving it a definite form and specific density. The average capacity of the conventional measurements (25.4 cm × 25.4 cm × 25.4 cm) is approximately 1 cube/5-6 min. or more and the equipment consists basically of: a) closed chambers designed to support the conditions inherent in the formation of carbon dioxide snow; b) gas recovery equipment; c) hydraulic compression systems; d) $CO_2$ storage tanks to which the gas returns, and e) condensation systems.

This equipment operates fundamentally by expanding liquid $CO_2$ to a pressure near 5 $kg/cm^2$ to create a mass of carbon dioxide snow from which gas is extracted via a compression element, to thus be able to reach a pressure close to atmospheric pressure, and later compressing this mass at 125 $kg/cm^2$ in a mold by means of a hydraulic system so that the resulting compressed mass of dry ice is later expelled with a maximum density of 1.55 $g/cc^3$. Because of the relatively high pressures required to compress the carbon dioxide snow to form a block of relatively high density, the equipment required is expensive to build and to operate.

Other processes that differ from the above, already traditionally used, have been disclosed in many patents, which are generally based on the thermodynamic properties of $CO_2$.

The concepts and details of the known processes and equipment can be found disclosed in the following U.S. Pat. Nos. which are included here for reference: 1,925,041; 1,925,619; 1,870,691; 1,950,180; 1,795,772; 2,738,658; 4,033,736; 3,817,045 and 4,780,119.

U.S. Pat. No. 1,925,041 to Auerbach describes a two-stage process where initially a layer of solid $CO_2$ is created in the bottom of a mold that serves as a seal and support, which is sufficiently dense to prevent the passage of gaseous $CO_2$ across it, after which liquid $CO_2$ is injected at a high pressure of 20 atmospheres (21.9 $kg/cm^2$). The liquid $CO_2$ evaporates slowly to form a dense block of $CO_2$ with a specific gravity above 1.4.

On the other hand, the U.S. Pat. No. 1,925,619 to Zumbra is concerned with the filling of a cylindrical chamber with $CO_2$ snow at atmospheric pressure and then injecting liquid $CO_2$ into the snow to create a mass of $CO_2$ snow that is saturated with cold liquid $CO_2$ under high pressure (above the triple point), for example, 5.47 $kg/cm^2$, in which form it is caused to solidify by freezing by means of filling an annular surrounding chamber with $CO_2$ snow at $-77.2°$ C.

The U.S. Pat. No. 1,870,691 to Rust et al. shows an extrusion device modified to produce solid $CO_2$ that uses an intermediate zone in which a mass of $CO_2$ snow is saturated with liquid $CO_2$ at 21.9 $kg/cm^2$ and is left to evaporate slowly. In general, the apparatus of the Rust et al. patent is similar to that disclosed in U.S. Pat. No. 1,925,041 to Auerbach, discussed above.

U.S. Pat. No. 1,950,180 to Jones et al. discloses several devices for producing blocks of solid $CO_2$ that have a generally uniform density above 1.5 $g/cm^3$. It discloses the concept of filling a chamber with snow at a pressure around atmospheric pressure and then flooding the chamber with liquid $CO_2$ at a pressure above the triple point to saturate and submerge the snow in the liquid and later slowly vaporize the liquid at a pressure very close to the triple point in order to create average large size $CO_2$ crystals, which are then compressed to form high density solid $CO_2$.

U.S. Pat. No. 1,795,772 to Goosman is directed generally to a compression and extrusion process, and U.S. Pat. No. 2,738,658 to Bronson shows the production of snow fed to a conventional dry ice pressure.

U.S. Pat. No. 4,033,736 to Cann is directed to a method and apparatus for making bars or spheres using a compression/extruder chamber and applying rotary force against a pressure applied by a spring.

Based on the disclosures of the above discussed patents, it is apparent that some of the processes of the prior art are designed for production of cubes of solid $CO_2$ by compression to product densities of 1.4-1.5 $g/cm^3$, and that other equipment produces cubes of solid $CO_2$ with average densities below 0.6-0.8 $g/cm^3$. The lower density form of carbon dioxide cannot satisfy the needs of the industry for dry ice, and its use is restricted to less demanding applications.

From the previously discussed patents, we can summarize that the invention disclosed in U.S. Pat. No. 1,925,041 is of particular interest, as it involves a process without compression which operates at a pressure above the triple point of the liquid $CO_2$ that passes instantaneously into a chamber, forming a layer of snow for sealing purposes and then the chamber is filled with liquid $CO_2$. The '041 patent involves a process in which the liquid $CO_2$ is introduced at substantially higher pressure than in the process of the present invention. The rate of $CO_2$ solidification in the '041 patent would be very slow in view of the lack of any effective $CO_2$ gas venting from the mold during solidification. The '041 patent does not include the $CO_2$ gas recovery system or the concept of feeding the liquid $CO_2$ in two stages as in the method and apparatus of the present invention.

All the remaining patents describe sundry methods for producing solid carbon dioxide and are of little relevance with respect to the method and apparatus of the present invention.

SUMMARY OF THE INVENTION

The present invention involves a method and apparatus for producing blocks of high density carbon dioxide using liquid $CO_2$ introduced into a mold at a first low pressure for a period of time and then at an intermediate pressure for a second period of time.

A conditioner is provided to supply the liquid $CO_2$ to the mold at an intermediate pressure of on the order of 9.8 $kg/cm^2$ to 10.9 $kg/cm^2$, and at a reduced temperature of on the order of −40° C. During the first period of introduction of low pressure $CO_2$ at a pressure of about 5 kg/cm$^2$ the mold is partially filled with $CO_2$ snow, and during the second period of time the intermediate pressure $CO_2$ saturates the snow and partially evaporates, causing the continuous freezing of the liquid $CO_2$ to form a high density block of $CO_2$.

There is also provided means for recovering $CO_2$ vapor from the conditioner and the mold and for recirculating that vapor to a compressor which compresses and recycles the recovered $CO_2$ vapor.

Accordingly, it is an object of the present invention to provide an improved two-stage method and a modular apparatus for automatic production of blocks of solid $CO_2$ at low pressure with a density from 1.1 to 1.5 gm/cm$^3$ or greater.

Another object of the present invention is to provide an improved method and apparatus for the production of high density solid $CO_2$ blocks in which the recovery of approximately 90% of the exhaust $CO_2$ vapor is accomplished by means of a $CO_2$ gas recovery and compression system.

It is an additional object of the present invention to provide an improved, low cost apparatus for producing solid $CO_2$ blocks at low pressure with a nominal production capacity of approximately one cubic foot/12-14 min. in order to satisfy markets that require low volumes of solid $CO_2$ cube production.

These and other objectives of the present invention will become apparent from the description given below.

BRIEF DESCRIPTION OF THE DRAWINGS

FIG. 2 is a perspective view of a mold wedge included in the apparatus of the invention;

FIG. 3 is a perspective view of a mold included in the apparatus of FIG. 1; and

FIG. 4 is a fragmentary sectional view showing the primary plug in detail in a section of the mold wedge of FIG. 2.

DETAILED DESCRIPTION OF PREFERRED EMBODIMENT

Figure 1:
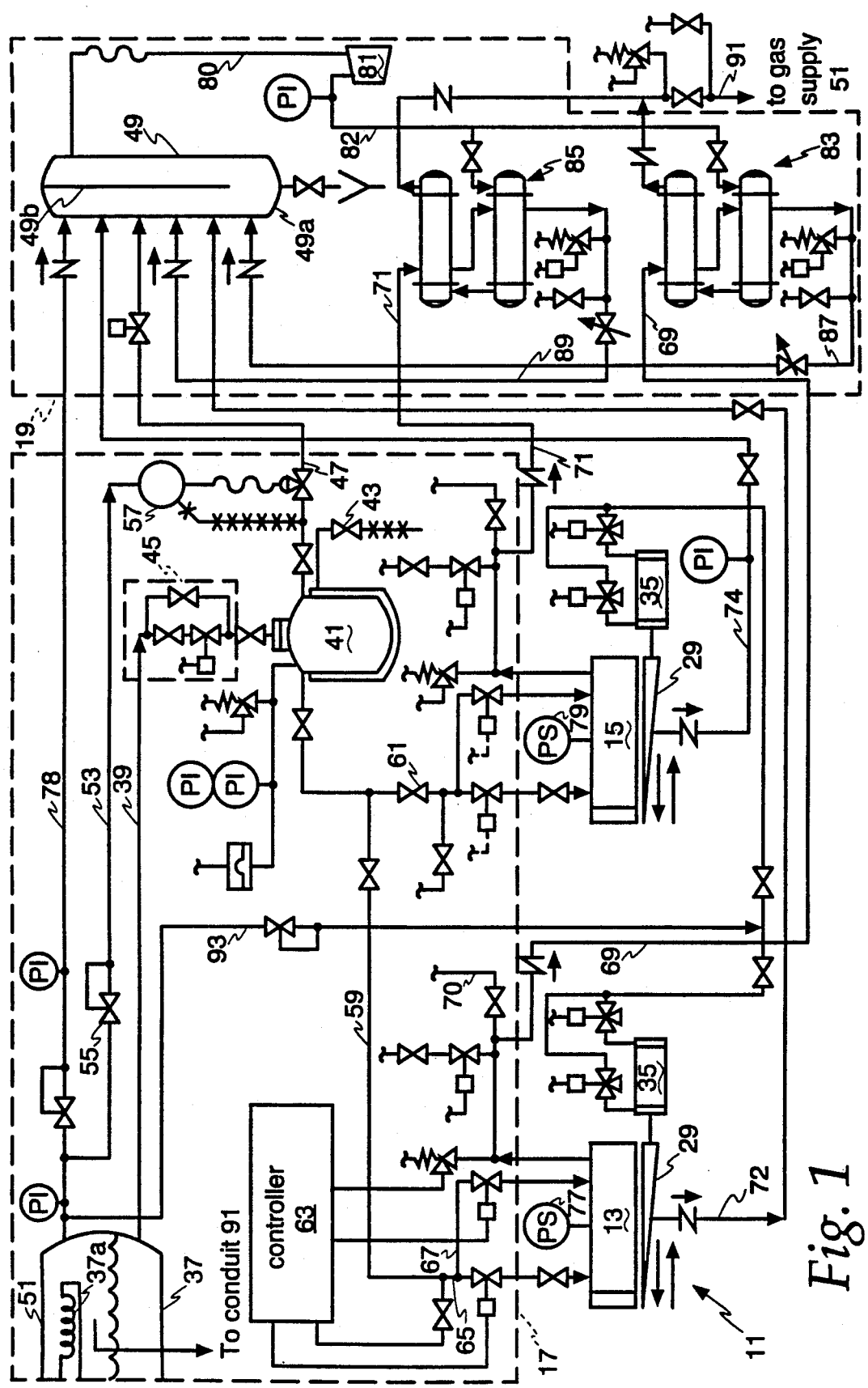
FIG. 1 is a schematic diagram of the apparatus for automatic production of solid $CO_2$ blocks at low pressure according to the present invention.

As illustrated in FIG. 1, the present invention is directed to apparatus 11 for producing blocks of solid carbon dioxide under low pressure. The apparatus 11 includes a pair of molds 13 and 15 which are operated alternatively to produce blocks of solid $CO_2$ which, in a constructed embodiment, were cubes measuring 24.5 cm on each side. Obviously, the apparatus could be operated with only one mold, but through the use of two molds, improved efficiency is obtained, since production may continue in one mold while the other is being unloaded. The apparatus 11 also includes a $CO_2$ supply system 17 and a $CO_2$ vapor recovery system 19.

Since the molds 13 and 15 are identical in construction, only mold 13 is described in detail in connection with FIGS. 2 to 4. The mold 13 includes a top wall 21, spaced side walls 23 and front and rear walls 25 which are formed of a cryogenic aluminum alloy having a wall thickness of 38.1 mm and are welded together to form a downwardly facing receptacle or container 27. The downwardly facing opening is closed by a movable bottom wall 29 which is formed of carbon steel covered with high molecular weight polyethylene and is mounted for slidable movement between a closed position and an open position as shown in FIG. 3. The bottom wall 29 is generally wedge-shaped and is supported for sliding movement by rails 31 supported on side plates 33 so that the wall 29 moves downwardly at the same time it moves laterally to facilitate disengagement of the wall 29 from the bottom of the formed block of solid $CO_2$.

As shown in FIG. 1, each of the bottom walls 29 of the molds 13 and 15 are controlled by pistons 35 which are actuated by $CO_2$ gas and move the bottom walls 29 between their open and closed positions. The opening of the molds 13 and 15 will take place automatically at the end of the production cycle for each block of solid $CO_2$, as will be explained in greater detail below.

The $CO_2$ supply system 17 is shown in FIG. 1 and includes a liquid $CO_2$ source 37 which would typically comprise a tank containing liquid $CO_2$ at 21.0 kg/cm$^2$ and −17.7° C. The source 37 is connected by a conduit 39 to a $CO_2$ conditioner 41. The conditioner 41 is preferably a stainless steel pressure vessel which is insulated with a vacuum jacket for isolating the liquid $CO_2$ from the environment. The conditioner 41 includes a liquid level control 43 and a flow control 45 in the conduit 39. The flow control 45 includes a solenoid valve which provides for automatic selection of various rates of flow through the solenoid valve or through a bypass arrangement. The conditioner 41 is operated to provide a first expansion of the liquid $CO_2$ from the source 37 to reduce the pressure to an intermediate level of between 9.5 kg/cm$^2$ and 12.4 kg/cm$^2$.

In order to vent the $CO_2$ vapor from the conditioner 41, there is provided a conduit 47 which connects between the conditioner 41 and a pulse tank 49. There is provided a source of $CO_2$ gas 51, typically the gas above the liquid $CO_2$ in tank 37, which is connected through a conduit 53 to a pressure controller 57 to supply pressure necessary to operate the valve. A pressure control valve 55 is located in the conduit 53 and the pressure controller 57 controls the flow through the conduit 47 to the pulse tank 49 to regulate the pressure within the conditioner 41. In the expansion of the high pressure liquid $CO_2$ to the intermediate pressure in the conditioner 41 the resulting ratio of liquid to gas is on the order of 8:2. This $CO_2$ gas generated in the expansion represents a significant amount which is totally recovered when circulated through the conduit 47 to the pulse tank 49.

The molds 13 and 15 are connected to the conditioner 41 by conduits 59 and 61, respectively, to deliver liquid $CO_2$ from the conditioner 41 to the molds 13 and 15, respectively. A timer and cycle controller 63 is provided to open and close the valves in the apparatus 11 on a timed basis or in response to pressure in some instances. The conduits 59 and 61 are each provided with alternative flow paths 65 and 67 which supply liquid $CO_2$ at a low or intermediate pressure to its respective mold. Each flow path 65 or 67 includes a solenoid valve and path 65 includes a needle valve to provide a low flow of liquid $CO_2$ at a pressure of between 3.6 and 5.1 kg/cm$^2$ for a period of time, to fill the respective mold with $CO_2$ snow while exhausting the $CO_2$ vapor through conduits 72 and 74, which extend between molds 13 and 15 and the vapor recovery system 19. The back pressure in the conduits is on the order of 3.7 kg/cm$^2$ provided by the recovery system 19.

After the low pressure portion of the cycle has been completed and the mold has been supplied with low density $CO_2$ snow, which takes about three minutes, the controller 63 closes the low flow path 65 and opens the solenoid valve for the high flow path 67 which delivers liquid $CO_2$ to its respective mold at an intermediate pressure of 9.8 to 10.9 kg/cm² at a temperature of $-40°$ C. Because this pressure is above the triple point, the $CO_2$ stream entering the mold contains liquid and vapor. The liquid $CO_2$ begins to freeze, with refrigeration or cooling being provided by the vaporization of a portion of the liquid $CO_2$.

The bottom wall 29 of each of the two molds 13 and 15 is formed with a vent opening 73 which extends through facing layer 29a of high molecular weight polyethylene, a cryogenic aluminum portion 29b and a steel wedge portion 29c. Between the layer 29a and the portion 29b there is provided a wool filter 75 which serves to prevent liquid $CO_2$ from passing through opening 73 to vapor exhausts 72 and 74 connected to the bottom of the molds 13 and 15, respectively. During the initial low pressure portion of the cycle, snow is formed in the mold and in the opening 73. As liquid $CO_2$ enters the mold in the intermediate pressure portion, the liquid $CO_2$ solidifies, forming a plug P of $CO_2$ snow to prevent liquid $CO_2$ from exiting the molds 13 and 15 at the bottom.

In the second or intermediate pressure portion of the cycle, the liquid $CO_2$ continues to solidify until the mold is filled with a solid block of high density $CO_2$. In order for the process of solidifying the liquid $CO_2$ to take place with sufficient speed to make it commercially feasible, the molds 13 and 15 must be provided with means to exhaust substantial volumes of $CO_2$ vapor. The solidification of the $CO_2$ liquid must be accomplished by refrigerating or cooling the liquid $CO_2$. To minimize equipment costs, the present invention utilizes vaporization or evaporation of the liquid $CO_2$ to provide the cooling to solidify the $CO_2$ which enters the molds at a reduced temperature of $-40°$ C. In this process of vaporization, about one kilogram of liquid $CO_2$ is required to produce $\frac{1}{2}$ kilogram of solid $CO_2$ and $\frac{1}{2}$ kilogram of $CO_2$ vapor. Because of the very large amount of $CO_2$ vapor produced in the process, it is important that it be recovered and reused.

The recovery of the $CO_2$ vapor is through the conduits 69 and 71 which are connected to the tops of the molds 13 and 15, respectively. These conduits extend to the vapor recovery system 19, and ultimately the recovered vapor is delivered to the pulse tank 49, as will be explained further below. While the conduits 69 and 71 should carry only $CO_2$ vapor being recovered, it is impossible to fill the molds 13 and 15 at an optimum rate, so that all the liquid $CO_2$ solidifies as it enters the molds, without sophisticated instrumentation that could not be justified from an economic point of view. Accordingly, in the intermediate pressure portion of the cycle, there will be occasions when $CO_2$ liquid will rise to the top of the molds and be exhausted along with the $CO_2$ vapor being recovered. It is in part because of this presence of liquid $CO_2$ in the conduits 69 and 71 that they are not connected directly to the pulse tank 49. In order to vaporize liquid $CO_2$ in the conduits 69 and 77, they are connected to heat exchangers 83 and 85, the function of which will be explained more completely below.

The second portion of the cycle may be terminated either on a timed basis or on the basis of the pressure drop within the mold as the block fills the mold. Pressure switches 77 and 79 on the tops of molds 13 and 15, respectively, are coupled to the controller 63 to terminate the flow of liquid $CO_2$ into the molds 13 and 15 when this pressure drop is sensed.

The mold is then vented through a line 70 and the bottom wall 29 is displaced by one of the cylinders 35 to permit removal of the completed block of $CO_2$. It is noted that the $CO_2$ vapor from supply 51 is connected by conduit 93 to both of the cylinders 35 with suitable solenoid valves under control of controller 63 to supply gas to the appropriate side of a cylinder 35 to effect the opening or closing of either of the molds.

In order to increase the efficiency of the apparatus 11, means including the $CO_2$ vapor recovery system 19 are provided to minimize the loss of $CO_2$ vapor. By increasing the efficiency in this manner, the usage of liquid $CO_2$ is reduced, which results in a lower production cost for the blocks of solid $CO_2$ made by the apparatus 11. As described above, the conduits 47, 69, 71, 72 and 74 recover $CO_2$ vapor from the conditioner 41, and from the molds 13 and 15, and circulate such vapor to the pulse tank 49 in the vapor recovery system 19. In addition, a conduit 78 interconnects the $CO_2$ vapor supply 51 to the pulse tank 49.

The pulse tank 49 includes a carbon steel tank 49a and a shock screen 49b. Connected to the pulse tank 49 by a conduit 80 is a compressor 81. The compressed vapor from the compressor 81 is circulated through a conduit 82 to heat exchangers 83 and 85, which are shell and tube type heat exchangers. The conduits 69 and 71 interconnect the molds 13 and 15 with the heat exchangers 83 and 85 so that any liquid $CO_2$ recovered from the molds 13 and 15 may be vaporized and circulated to the pulse tank 49 through conduits 87 and 89. The heat exchangers 83 and 85 preferably operate with the hot compressed $CO_2$ gas from compressor 81 passing through the tubes of the heat exchangers and the liquid $CO_2$ and low temperature $CO_2$ gas in the shell portion of the exchanger. After passing through heat exchangers 83 and 85, the compressed gas from the compressor 81 is circulated by a conduit 91 back to the $CO_2$ gas supply 51. Refrigeration coils 37a are included in the source or tank 37 to condense the recirculated $CO_2$ vapor; such coils are supplied by refrigeration means (not shown) as is conventional. The pulse tank 49 performs an important function in equalizing the load on the compressor 81 and providing a constant pressure $CO_2$ gas to the suction side of the compressor. During certain periods of the cycle of operation of the molds 13 and 15, there is little $CO_2$ vapor passing to the pulse tank 49 through the vapor recovery conduits 47, 69, 71, 72 and 74. During these periods, the $CO_2$ vapor from the vapor supply 51 through conduit 78 maintains the flow to the compressor 81 through the pulse tank 49, thus providing a controlled pressure source of $CO_2$ gas and avoiding the necessity of shutting the compressor 81 down during such periods.

It should be understood that, while not described in detail, the controller 63 would be connected to the various valves located throughout the apparatus to maintain the flow from the source 37 to the conditioner 41, to maintain within the conditioner 41 the desired intermediate pressure of between 9.5 kg/cm² and 12.4 kg/cm² at a temperature of about $-40°$ C., and to maintain suitable pressure levels in the pulse tank and back pressures to the molds 13 and 15. For a better understanding of the method and apparatus of the present invention, there is provided below Table I, which shows a material balance for a typical run of a constructed embodiment of the invention having a layout as shown in FIG. 1.

TABLE I

| LINE | LIQ. $CO_2$ kg/hr | $CO_2$ GAS kg/hr | SOLID $CO_2$ kg/hr | PRESSURE kg/cm$^2$ | TEMP. °C. | DENSITY g/cc |
|---|---|---|---|---|---|---|
| 39 | 187.5 | — | — | 22.7 | −17.7 | 1.0188 |
| 47 | — | 37.6 | — | 3.7 | 1.6 | 0.0064 |
| 59 | 149.8 | — | — | 11.7 | −40.0 | 1.1438 |
| 72 | — | 15.4 | — | 3.7 | −78.8 | 0.0105 |
| 69 | 15.4 | — | — | 9.9 | −40.0 | 1.1133 |
| 80 | — | 68.5 | — | 3.7 | 12.7 | 0.0064 |
| 91 | — | 68.5 | — | 22.7 | 51.6 | 0.0261 |
| 70 | — | 33.5 | — | 0.8 | −78.8 | 0.0032 |
| 13 | — | — | 85.3 | 0.8 | −78.8 | 1.2816 |

The method and apparatus of the present invention has been described above in connection with a preferred embodiment that permits the manufacture of a 24.5 cm cube of solid $CO_2$ of a density of on the order of 1.3 g/cm$^3$ in 12 to 14 minutes. The apparatus is relatively inexpensive to manufacture, since it requires no high compression forces to achieve the high density dry ice. The speed of solidification of the liquid $CO_2$ is achieved by the efficient venting system which receives and reuses the $CO_2$ vapor from the molds 13 and 15. The method involving a two stage process with the second stage utilizing $CO_2$ liquid at an intermediate pressure and reduced temperature is novel and not suggested by any of the prior art processes.

While the method and apparatus of the invention have been described in preferred embodiments, it is to be understood that various changes and modifications may be made within the purview of the appended claims without departing from the true scope of the invention in its broader aspects.

What is claimed is:

1. A method of producing blocks of high density solid $CO_2$ at low pressure comprising:

providing a supply of conditioned liquid $CO_2$ at an intermediate pressure of on the order of between 9.5 kg/cm$^2$ and 12.4 kg/cm$^2$ and at a reduced temperature of on the order of −40° C., introducing liquid $CO_2$ at low pressure into a mold for a period of time and at flow rate to partially fill the mold with $CO_2$ snow, introducing into said mold liquid $CO_2$ from said supply at a flow rate and intermediate pressure and at a reduced temperature such that the liquid $CO_2$ saturates said $CO_2$ snow within said mold and through evaporation of the liquid $CO_2$ continuously freezes the remaining liquid $CO_2$ during such liquid $CO_2$ introduction to form a high density block of sold $CO_2$, and continuously venting from said mold the vapor produced by the vaporization of liquid $CO_2$ in cooling and solidifying a portion of said liquid $CO_2$ during the introduction of intermediate pressure liquid $CO_2$ into said mold.

2. A method of producing blocks of high density solid $CO_2$ as set forth in claim 1 wherein said intermediate pressure of said liquid $CO_2$ introduced into said mold is on the order of 9.8 kg/cm$^2$ to 10.9 kg/cm$^2$ at a temperature of on the order of −40° C.

3. A method of producing blocks of high density solid $CO_2$ as set forth in claim 2, including:

providing a supply of liquid $CO_2$ at a high pressure on the order of 21 kg/cm$^2$ and at a temperature on the order of −17.7° C., circulating said liquid $CO_2$ at a high pressure through pressure reducing means to said supply of conditioned liquid $CO_2$, providing compressor means to recover and compress $CO_2$ gas from said mold, and circulating the $CO_2$ compressed by said compressor means to said supply of liquid $CO_2$ at a high pressure where it is recondensed to a liquid.

4. A method of producing blocks of high density solid $CO_2$ as set forth in claim 1 further comprising the step of automatically terminating the introduction of intermediate pressure liquid $CO_2$ into said mold when said block fills said mold.

5. A method for automatic production of blocks of solid $CO_2$ under pressure comprising:

submitting a jet of liquid $CO_2$ of 21.9 kg/cm$^2$ and −17.7° C. to a first expansion inside a pressurized receptacle to reduce its pressure to between 9.5 kg/cm$^2$ and 12.4 kg/cm$^2$, causing a second expansion in two stages of the resulting expanded liquid $CO_2$ inside at least one closed mold, the first stage being carried out under an approximate pressure of between 3.6 and 5.1 kg/cm$^2$ during a definite time, and the second stage being at an approximate pressure range of 9.8 kg/cm$^2$ to 10.9 kg/cm$^2$ during a definite time in order to form a plug of $CO_2$ snow inside such mold, over and through which a mass of dry ice will be formed with an approximate density of 1.28 to 1.5 g/cm$^3$, and compressing the $CO_2$ gas generated in such first and second expansions to either recycle it to said jet and/or use it as fuel for automating the stages of such method.

6. Apparatus for producing high density solid $CO_2$ at low pressure comprising:

a closed mold having a liquid inlet and a vapor vent means, said mold having a chamber which is accessible to remove a block of solid $CO_2$, a liquid $CO_2$ conditioning system for supplying liquid $CO_2$ at an intermediate pressure and a reduced temperature to said mold, a first flow control to supply liquid $CO_2$ at a low pressure from said conditioning system to said liquid inlet for a period of time to supply said mold with $CO_2$ snow, and a second flow control to supply liquid $CO_2$ at an intermediate pressure from said conditioning system to said inlet at a rate to saturate said $CO_2$ snow and through evaporation of liquid $CO_2$ to continuously freeze liquid $CO_2$ to form high density solid $CO_2$.

7. Apparatus for producing high density solid $CO_2$ as recited in claim 6 including recovery apparatus for $CO_2$ vapor including a vent on said mold and a compressor to recycle $CO_2$ vapor from said mold to said $CO_2$ conditioning system.

8. Apparatus for producing high density solid $CO_2$ as recited in claim 7 wherein said first flow control supplies liquid $CO_2$ liquid at a pressure on the order of between 3.6 and 5.1 kg/cm$^2$ and approximately from 9.8 kg/cm$^2$ to 10.9 kg/cm$^2$ and at a temperature of approximately −40° C.

9. Apparatus for producing high density solid $CO_2$ as recited in claim 6 including a source of liquid $CO_2$ connected to supply liquid $CO_2$ through expansion means to said liquid $CO_2$ conditioning system, a compressor connected to recover $CO_2$ gas from said mold and said $CO_2$ conditioning system and to compress said $CO_2$ gas, and a conduit connected to said compressor and said source of liquid $CO_2$ to supply compressed $CO_2$ gas from said compressor to said source of liquid $CO_2$.

10. Apparatus for automatic production of blocks of solid $CO_2$ under pressure comprising:

a liquid $CO_2$ conditioning system which supplies liquid $CO_2$ at a first low pressure for a selected period of time and at a second intermediate pressure for a selected period of time, a closed mold coupled to said conditioning system to receive the liquid $CO_2$ therefrom, a $CO_2$ gas recovery system including a compressor connected to receive liquid $CO_2$ and vapor from said mold and from said conditioning system, and means circulating $CO_2$ from said compressor to said liquid $CO_2$ conditioning system.

11. Apparatus for automatic production of blocks of solid $CO_2$ under low pressure as recited in claim 10 including heat exchange means connected to said $CO_2$ gas recovery system and to said compressor whereby the compressed $CO_2$ from said compressor vaporizes liquid $CO_2$ recovered from said mold.

12. Apparatus for automatic production of blocks of solid $CO_2$ under low pressure as recited in claim 11 wherein said $CO_2$ gas recovery system includes a pulse tank disposed between said compressor and conditioning system and said mold whereby substantially all $CO_2$ vapor recirculated to said compressor passes through said pulse tank.

13. Apparatus for automatic production of blocks of solid $CO_2$ under low pressure as recited in claim 10 wherein said mold has a cube shape with one wall being displaceable between an open position for removal of a cube of solid $CO_2$ and a closed position forming an enclosure of cube shape in which said liquid $CO_2$ is received, a gas operated cylinder connected to said one wall to displace said one wall between its open and closed positions, means coupled to said $CO_2$ gas recovery system for supplying recovered $CO_2$ gas to said cylinder to operate said cylinder.

14. Apparatus for automatic production of blocks of solid $CO_2$ under low pressure as recited in claim 10 wherein said first low pressure supplying of liquid $CO_2$ partially fills said mold with $CO_2$ snow and said second intermediate pressure supplying of liquid $CO_2$ causes saturation of said $CO_2$ snow and continuous solidification as a consequence of evaporation.

15. Apparatus for automatic production of blocks of solid $CO_2$ under low pressure as recited in claim 14 wherein said intermediate pressure supplying of liquid $CO_2$ is supplied to said mold at a pressure on the order of 9.8 $kg/cm^2$ to 10.9 $kg/cm^2$ at a temperature on the order of $-40°$ C.

16. Apparatus for automatic production of blocks of solid $CO_2$ under pressure, comprising:

a liquid $CO_2$ conditioning system which, under control of a control means, supplies liquid $CO_2$ at a first low pressure so as to produce $CO_2$ snow, and which, under control of the same control means, supplies liquid $CO_2$ at a second intermediate pressure, at least one closed mold coupled to said conditioning system, control means coupled to said conditioning system for controlling said conditioning system so as to supply liquid $CO_2$ to said mold at low pressure so as to at least partially fill said mold with $CO_2$ snow and for controlling said conditioning system so as to supply liquid $CO_2$ to said mold at intermediate pressure so as to saturate said $CO_2$ snow with liquid $CO_2$ and evaporate, so as to substantially continuously solidify $CO_2$ in said mold to form blocks of solid $CO_2$, and a $CO_2$ gas recovery system in closed circuit with said mold and said conditioning system.

17. Apparatus in accordance with claim 16 wherein such mold has a cube form shape of 25.4 cm on each edge and is made of a cryogenic aluminum alloy with wall thickness of 38.1 mm.

18. Apparatus in accordance with claim 17 wherein such mold has a removable wall comprising a wedge-shaped base coupled to a piston for its lateral displacement to allow expulsion of the cube.

19. Apparatus in accordance with claim 18 wherein such wedge is of carbon steel, covered with a layer of high molecular weight polyethylene to insure air tightness in the mold.

20. Apparatus in accordance with claim 19 wherein said removable wedge defines a gas vent passage and includes a wool filter blocking the gas vent passage, said filter being retained beneath the high molecular weight polyethylene layer.

* * * * *